Oct. 21, 1952     P. A. NOXON     2,614,335
NAVIGATION SYSTEM
Filed Nov. 22, 1948
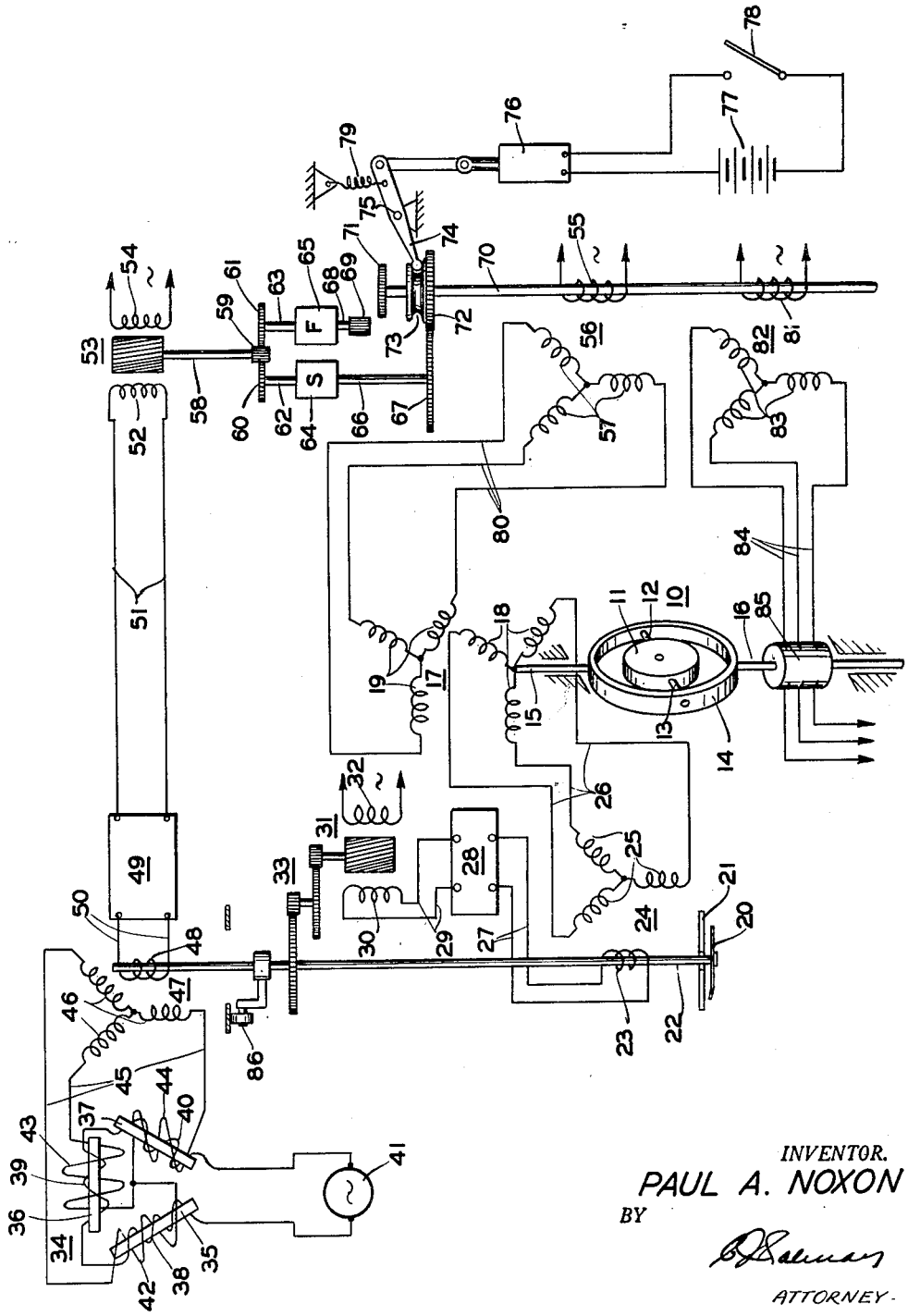
INVENTOR.
PAUL A. NOXON
BY
ATTORNEY.

Patented Oct. 21, 1952

2,614,335

UNITED STATES PATENT OFFICE 2,614,335

NAVIGATION SYSTEM

Paul A. Noxon, Tenafly, N. J., assignor to Bendix Aviation Corporation, Teterboro, N. J., a corporation of Delaware Application November 22, 1948, Serial No. 61,343

7 Claims. (Cl. 33—222)

This invention generally relates to navigation systems for mobile craft such as aircraft, for example, and more particularly to direction indicating or maintaining means utilizing a directional gyroscope.

As is well known in the art, directional gyroscopes are subject to precession errors due to bearing friction and other causes which effectively destroy the utility of the gyroscope as a fixed reference. These errors are particularly undesirable because they are cumulative in nature. In order to circumvent such errors, a number of expedients has been heretofore proposed most of which contemplate the use of some form of magnetic compass to "slave" the gyroscope to thereby automatically precess it to a fixed reference by imposing a corrective precessive force on the gyroscope subsequent to its departure from the required reference. The objectionable part of such known arrangements is that precessing expedients are required, parts of which are mounted directly on the gyro.

An object of the present invention, therefore, is to provide a novel direction indicating or maintaining means utilizing a directional gyroscope in which the requirement for corrective precession has been eliminated.

Another object of the present invention is to provide a novel navigation system for mobile craft for either indicating direction and/or maintaining the craft on a predetermined heading comprising a directional gyroscope and a magnetic compass correcting the system for precession errors of the gyroscope without imposing a corrective precession force on the gyro.

A further object is to provide a novel compass system for a mobile craft comprising a magnetic compass and a directional gyroscope combined in a novel manner.

Another object is to provide a novel compass system for aircraft which will supply all the directional data necessary for navigational and control purposes.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention.

The single figure of the drawing constitutes a circuit diagram showing schematically the relative arrangement of the parts constituting the novel navigation system of the present invention.

Referring now to the drawing for a more detailed description of the present invention, the novel compass system hereof is there illustrated as including a directional gyroscope 10 having a rotor (not shown), which may be either electrically or air driven, mounted within a rotor casing 11, the rotor being provided with normally horizontal spin axis. Rotor case 11 is mounted by way of inner trunnions 12 and 13 for tilting motion about a horizontal axis, perpendicular to the spin axis, within a gimbal ring 14, the ring, in turn, being mounted for angular motion about a vertical axis by way of outer trunnions 15 and 16. The outer trunnions are journalled within a suitable instrument housing (not shown) which is rigidly mounted on the craft and suitable erecting means (not shown) may be included to maintain the rotor spin axis in a substantially horizontal plane.

Since the property of the directional gyro is to maintain a fixed reference in space, any relative motion between the craft and gyro will be equal to the angular amount that the craft has departed from a predetermined course and such amount may be visually indicated to the pilot. To this end the gyro is provided with an electrical differential mechanism in the form of an inductive device 17 having a three phase wound rotor 18 and a three phase wound stator 19, the stator being suitably fixed to the craft for movement therewith relative to the rotor which, in turn, is fixed to vertical trunnion 15 to be maintained in a fixed position by the gyro. Assuming the windings of stator 19 to be energized and the gyro to be positioned in a desired direction so that rotor 18 will be in a position normal to the resultant magnetic field of stator 19, no signals will appear in the rotor windings. As soon, however, as relative motion between the gyro and the craft occurs, the null relation between the rotor and stator will be destroyed and signals will appear in the rotor windings.

A pointer 20 is provided for indicating, relative to a suitable compass dial 21, the amount of relative motion of the craft and gyro, the pointer being fastened to a shaft 22, journalled within bearings (not shown) which are fixed to the craft. Shaft 22 supports thereon a rotor winding 23 of an inductive device 24 having a three phase wound stator 25 which is connected by way of leads 26 with rotor windings 18 of inductive device 17.

Rotor winding 23 of inductive device 24 is connected by way of leads 27 with the input of a conventional vacuum tube amplifier 28, the output of which is connected by way of leads 29 with the variable phase winding 30 of a two phase induction motor 31, the fixed phase 32 of the motor being energized from a suitable source of alternating current (not shown). The motor drivably connects with indicator shaft 22 through a speed reduction gear system 33.

As a result of the aforementioned signals developed within rotor winding 18 of inductive device 17 similar signals are communicated to stator windings 25 of inductive device 24. If rotor 23 is at some position other than an electrical null relative to stator 25, a signal is induced within rotor 23 which is communicated to and amplified within amplifier 28, the output thereof energizing motor 31 so that the latter runs until it drives rotor 23 to an electrical null relative to its stator. When such null is achieved the rotor signal drops to zero and the motor is deenergized. During rotor displacement pointer 20 is moved angularly relative to dial 21 to indicate the amount of relative motion of the craft and gyro.

Where the gyro maintains a fixed reference, movement of pointer 20 will correspond to the amount of craft departure from the reference. However, where pointer movement occurs due to wandering of the gyro an erroneous indication is received designating a change in craft course which actually has not occurred. As mentioned before, it has been proposed to correct for such erroneous indications by utilizing forces developed by some form of magnetic compass to precess the gyro to a desired position subsequent to a departure by the gyro from such position. This is undesirable inasmuch as the gyro is subjected to unnatural precessive forces.

In accordance with the novel arrangement of the present invention, corrections for gyro wandering are provided by the use of a magnetic compass without precessing or "slaving" the gyro as heretofore. To this end a pendulously mounted earth inductor compass, generally designated with the reference character 34, is provided which comprises three cores or laminations 35, 36 and 37 arranged in triangular relation, each lamination having an energizing winding 38, 39 and 40, the windings being connected in series relation with each other and with a suitable source 41 of alternating current. Secondary windings 42, 43 and 44 are also provided for each of the laminations, like ends of each winding being interconnected at a common junction point and the opposite end of each winding being connected by way of leads 45 with stator windings 46 of an inductive coupling device 47 whose rotor 48 is displaceable by shaft 22. As is well known with compasses of this character, signals are developed within each of the secondary windings and communicated to stator windings 46 corresponding to the angular disposition of each lamination relative to the earth's magnetic field.

If rotor 48 of inductive device 47 is initially in some position other than normal relative to the resultant magnetic field of stator windings 46, a signal is induced within rotor 48 which, in conventional compasses of this character is fed to an amplifier, such as amplifier 28, and out therefrom to energize a two phase induction motor to drive rotor 48 to a null position at which time the rotor signal drops to zero. Inasmuch as the present invention is concerned with correcting the gyro for any wandering thereof from a fixed reference, the signal within rotor 48 is instead fed into the input of a second amplifier 49 by way of leads 50, the amplified output being fed by way of leads 51 to the variable phase 52 of a second two phase induction motor 53, whose fixed phase 54 is fed through a frequency doubler (not shown) from a suitable source of current.

Motor 53, when energized, drives a rotor winding 55 of an inductive device 56 relative to its stator 57 through a fast or slow gear train in a manner and for a purpose to presently appear. To this end, motor 53 is provided with a shaft 58 at the free end of which is a pinion 59 meshing with two gears 60 and 61. Gear 60 is carried by a shaft 62 while gear 61 is carried by a shaft 63, the former shaft being associated with a speed reduction gear train 64 and the latter shaft being associated with a speed multiplication gear train 65. Gear train 64 is provided with an output shaft 66 carrying a gear 67 while gear train 65 is provided with an output shaft 68 carrying a pinion 69 thereon.

Rotor winding 55 of inductive device 56 is carried by a shaft 70 which, at its upper extremity, is provided with a pair of spaced gears 71 and 72. A clutch member 73 is sleeved on shaft 70 to selectively engage gears 67, 72 or 69, 71 so that shaft 70 may be driven by motor 53 at either a slow or fast rate. A link 74, pivotally mounted at 75, is utilized to actuate clutch 73 in a desired manner, the free end of the link being connected to a solenoid 76 which, in turn, when energized from a battery 77 in response to closing of a switch 78 actuates the clutch against a spring 79 to disengage gears 67, 72 and engage gears 69, 71. Opening of switch 78, deenergizes the solenoid so that spring 79 actuates the clutch to disengage gears 69, 71 and engage gears 67, 72.

Stator windings 57 of inductive device 56 connect by way of leads 80 with stator windings 19 of inductive differential device 17 while rotor winding 55 of inductive device 56 is energized from a suitable source of alternating current. Signals will be induced within stator windings 57 and communicated to stator windings 19 in accordance with the angular disposition of rotor 55 relative to its stator 57.

For initially synchronizing the entire system, it may be assumed that the craft embodying the novel subject matter hereof is on the ground with its longitudinal axis aligned with due north in which position compass 34 is satisfied and pointer 20 indicates due north relative to dial 21. If the directional gyro is positioned so that its horizontal spin axis is normal to the longitudinal axis of the craft the entire system is satisfied. It may be assumed, however, that the directional gyro is displaced from north 10° in an easterly direction. In such an event, rotor winding 18 of inductive device 17 will be angularly displaced by the gyro relative to its stator 19 so that its electrical axis will be at some position other than normal relative to the stator. As a result of such displacement, signals are induced within rotor windings 18 and communicated to stator windings 25 as a result of which a signal is induced within rotor winding 23. Such signal is communicated to and amplified within amplifier 28 to energize motor 31 whereupon shaft 22 is driven to displace pointer 20 as well as rotor 48 of inductive device 47 relative to stator 46.

In the foregoing manner, rotor 48 is displaced from its null position to have a signal induced therein which is amplified by amplifier 49 to energize motor 53. Since it is desired that the system be synchronized at this point in a rapid manner, switch 78 is closed so that gears 67, 72 are disengaged and gears 69 and 71 are drivably engaged. Operation of motor 53 displaces rotor winding 55 relative to its stator 57 in a rapid manner through gear train 65, displacement of rotor 55 causing a change in the signals induced within stator windings 57 and communicated to stator windings 19. The arrangement of the parts is such that the signals now induced in rotor windings 18 and communicated to stator windings 25 of inductive device 24 are such as to induce a signal in rotor windings 23, opposite in phase to the signal induced therein due to the initial gyro displacement considered above, as a result of which motor 31 is operated in an opposite direction to return pointer 20 relative to dial 21 to indicate a northerly direction and to drive rotor winding 48 to a null relative to its stator 46 whereupon the signal of rotor 48 drops to zero to deenergize motor 53.

In actual flight, any wandering of the gyro is corrected by the compass in the manner above described to thereby provide a reliable and novel compass system. Wandering of the gyro will manifest itself in pointer displacement as well as displacement of rotor winding 48 from a null, the latter generating a corrective signal which is effective to return the pointer to a correct indicating position and rotor 48 to its null. This correction afforded by the compass, therefore, is not applied on the gyro but on the pointer and pointer shaft 22. Once the system is synchronized, the gyro is permitted to wander at will but is still utilized as a reliable reference because of the presence of compass 34.

Conventional electrical transmitter devices may be associated with shaft 22 and connected to remote receiving stations which will duplicate the reading of pointer 20 relative to its dial. High precision data may be directly transmitted from the gyro without the dynamic interference of motor 31. To this latter end, the rotor 81 of a further inductive device 82 may be associated with shaft 70 which is inductively coupled with stator windings 83, the latter being connected by way of leads 84 with the stator of an electrical differential device 85, similar to device 17. The rotor of device 85 is electrically connected to whatever apparatus it is desired to control therefrom. A conventional cam corrector mechanism 86 is interposed in shaft 22 between motor 31 and inductive device 47 so that craft heading as indicated by the novel system hereof will cause rotor 48 to be positioned so as to compensate for any magnetic deviation affecting compass 34.

Once the system is synchronized, switch 78 is opened so that gears 69, 71 are disengaged and gears 67, 72 are engaged. This slow speed position is the normal operating position of the system so that rotor 55 of inductive device 56 is turned very slowly thereby affording a maximum magnetic correction rate of two degrees per minute. Thus, acceleration forces acting on the pendulously mounted compass will not effect the ultimate indication or control achieved by the system. Moreover, during a turn, if desired, the compass may be disconnected in a conventional manner from motor 53.

The precision data supplied by differential device 85 may be utilized to operate an automatic pilot of the nature shown in pending application Serial No. 516,488 filed December 31, 1943. If desired, the rudder control pick-off shown in the latter application may be connected by way of an electro-magnetic clutch and a centralizing device to shaft 22 hereof.

While but a single embodiment of the present invention has been shown and described in the drawing, it is to be understood that various changes may be made in the construction and relative arrangement of the parts without departing from the scope of the invention. For example, while an earth inductor type of compass has been shown of the nature disclosed in U. S. Reissue Pat. No. 22,699 it may be replaced by a compass of the character disclosed in Bechberger U. S. Pat. No. 2,342,637, issued February 29, 1944, in which a three phase wound core is inductively coupled with the magnet of a conventional magnetic compass.

I claim:

1. A direction indicating system for mobile craft comprising a directional gyroscope subject to errors due to precession about a normally vertical axis, an indicating device, electrical differential means comprising a fixed part and an inductively coupled movable part fastened to said gyroscope for connecting the latter with said device for actuating said device by relative motion of said craft and gyroscope, and a magnetic compass connected to said differential means and adapted to provide an electrical signal corresponding to wandering of the gyroscope to operate said device independently of said gyroscope for correcting said device for errors due to gyro precession.

2. A direction indicating system for mobile craft comprising a directional gyroscope subject to errors due to precession about a normally vertical axis, an indicating device, a torque amplifier connected for operating said device, an inductive signal generator operable by said gyroscope for energizing said torque amplifier, and compass means connected to said generator and adapted to provide an electrical signal corresponding to wandering of the gyroscope to energize said torque amplifier independently of said gyroscope for correcting said device for errors due to gyroscope precession.

3. A direction indicating system for mobile craft comprising a directional gyroscope subject to errors due to precession about a normally vertical axis, an indicating device, a torque amplifier connected for operating said device, a signal generator comprising an inductive device having a fixed and a movable part connected for energizing said torque amplifier, one of said parts being operable by said gyroscope during relative movement of said craft and gyroscope, and means responsive to the earth's magnetic field connected to the other of said parts of said generator and adapted to provide an electrical signal corresponding to wandering of the gyroscope to energize said other part for correcting said device for errors due to gyroscope precession.

4. Navigation system for mobile craft comprising a directional gyroscope mounted on said craft and subject to errors due to precession about a normally vertical axis, controlled means comprising a two-part inductive device having a movable part and a fixed part and a torque amplifier connected to the movable part and energized by the latter when a signal appears thereat to drive the movable part to a null relative to the fixed part, an electric differential device operated by relative motion of said craft and gyroscope and connected to the fixed part of said inductive device for destroying the normally balanced electrical condition of said inductive device to operate said controlled means, means responsive to the earth's magnetic field comprising a second two-part inductive device having a fixed part and a movable part drivably connected with said torque amplifier whereby in response to wandering of said gyroscope from a reference as sensed by said last-mentioned means the movable part of said second inductive device is driven away from a normally null relation relative to its related fixed part whereby a correction signal is developed in said last-named movable part, and means responsive to said correction signal connected to said differential device for correcting the operation of said controlled means for wandering of said gyroscope.

5. Navigation system for mobile craft comprising a directional gyroscope mounted on said craft and subject to errors due to precession about a normally vertical axis, controlled means comprising a normally balanced inductive device and a torque amplifier connected to the device and energized by the latter when said device is unbalanced for re-balancing said device, an electrical differential device operated by relative motion of said craft and gyroscope and connected to said inductive device for unbalancing the latter to operate said controlled means, means responsive to the earth's magnetic field comprising a second normally balanced inductive device connected with said torque amplifier whereby in response to wandering of said gyroscope from a reference as sensed by said last-mentioned means said second inductive device is unbalanced to develop a correction signal, and means responsive to said signal connected to said differential device for correcting the operation of said controlled means for wandering of said gyroscope.

6. Navigation system for mobile craft comprising a directional gyroscope mounted on said craft and subject to errors due to precession about a normally vertical axis, controlled means comprising a normally balanced electrical device and a torque amplifier connected to the device and energized by the latter when said device is unbalanced for re-balancing said device, an electrical differential device operated by relative motion of said craft and gyroscope and connected to said electrical device for unbalancing the latter to operate said controlled means, means responsive to the earth's magnetic field comprising a second normally balanced electrical device connected with said torque amplifier whereby in response to wandering of said gyroscope from a reference as sensed by said last-mentioned means said second inductive device is unbalanced to develop a correction signal, a second torque amplifier operated by said signal, and means connecting said last-named amplifier and said differential device for slowly correcting the operation of said controlled means for wandering of said gyroscope.

7. In a navigation system for mobile craft, a directional free gyroscope mounted on said craft, a differential inductive device having a stator, and a rotor rotated by relative movement of the craft and gyroscope, controlled means including a normally balanced first electrical device connected to said differential device, and a torque amplifier connected to said electrical device and energized by the latter when said electrical device is unbalanced and driving said electrical device to balanced position, means responsive to the earth's magnetic field including a second normally balanced electrical device drivingly associated with said torque amplifier and developing a correction signal when said gyroscope wanders due to precession of the gyroscope axis, a second torque amplifier responsive to the error signal, a third electrical device driven by said second torque amplifier and connected to the stator of said differential device for developing a signal in said first electrical device for slowly correcting the position of the controlled means for wandering of said gyroscope.

PAUL A. NOXON.

REFERENCES CITED

The following references are of record in the file of this patent:

UNITED STATES PATENTS

| Number | Name | Date |
|---|---|---|
| 1,684,137 | Mittag | Sept. 11, 1928 |
| 2,053,409 | Urfer | Sept. 8, 1936 |
| 2,056,348 | Edwards | Oct. 6, 1936 |
| 2,313,682 | Stuart | Mar. 9, 1943 |

FOREIGN PATENTS

| Number | Country | Date |
|---|---|---|
| 793,301 | France | Nov. 16, 1935 |
| 49,251 | France | Nov. 12, 1938 |
| | (1st addition to No. 793,301) | |